United States Patent [19]
Gilbert, Sr.

[11] Patent Number: 5,386,600
[45] Date of Patent: Feb. 7, 1995

[54] LATCHING FOOT PEDAL ACTUATED TAP WATER FLOW CONTROLLER

[76] Inventor: Robert V. Gilbert, Sr., 221 Albania Dr., Luling, La. 70070

[21] Appl. No.: 45,712

[22] Filed: Apr. 14, 1993

[51] Int. Cl.⁶ ............................................. F16K 31/62
[52] U.S. Cl. ........................................ 4/677; 4/675; 251/295; 251/101; 251/107
[58] Field of Search .............. 4/619, 620, 626, 630, 4/675, 676, 677; 251/294, 295, 242, 236, 320, 296, 101–110; 74/512, 527, 529, 539

[56] References Cited

U.S. PATENT DOCUMENTS

| | | | |
|---|---|---|---|
| 856,981 | 6/1907 | McCarroll | 251/102 |
| 1,176,784 | 3/1916 | Speiden | 4/677 |
| 1,318,120 | 10/1919 | Wheaton | 251/109 |
| 1,485,958 | 3/1924 | Bridgham | 251/296 |
| 1,848,456 | 3/1932 | Beebe | 251/295 |
| 2,041,002 | 5/1936 | Kreuzer et al. | 251/107 |
| 2,268,699 | 1/1942 | Cotner | 251/295 |
| 2,693,716 | 11/1954 | Ludwig | 251/295 |
| 2,830,618 | 4/1958 | Mitchell | 251/295 |
| 2,995,047 | 8/1961 | Hinsey | 74/540 |
| 3,016,226 | 1/1962 | Freeman | 251/109 |
| 3,396,937 | 8/1968 | McDougall | 251/107 |
| 4,385,529 | 5/1983 | Ejiri et al. | 74/539 |
| 4,441,380 | 4/1984 | Kawaguchi et al. | 74/512 |
| 4,597,307 | 7/1986 | Kawaguchi et al. | 74/529 |
| 5,199,119 | 4/1993 | Weber | 251/295 |

FOREIGN PATENT DOCUMENTS

| | | | |
|---|---|---|---|
| 731300 | 8/1932 | France | 251/107 |
| 276780 | 9/1927 | United Kingdom | 251/107 |

Primary Examiner—Henry J. Recla
Assistant Examiner—Gregory M. Vidovich
Attorney, Agent, or Firm—Kenneth A. Roddy

[57] ABSTRACT

An assembly with valves (16) and (20) that permits fluid flow through the invention when the foot pedal (13) is depressed. A mechanism engaged by depressing toe kick (11) will latch pedal (13) in a position where fluid flow continues after the foot is removed. Depressing pedal (13) while the latch is engaged, causes the latch to automatically disengage. When pedal (13) is released at this time, fluid flow will stop. The assembly is designed to be installed in the cabinet (3) under a kitchen or lavatory sink (4) with all elements concealed except part of pedal (13) and part of the latch mechanism, The assembly is compact by design and is easily installed by cutting a hole for the pedal (13) in the lowest shelf of cabinet (3), securing it with screws, and routing flexible hoses from the sources of hot and cold water to the invention, and from the invention to the hot and cold water connections of a standard faucet set (5.)

11 Claims, 5 Drawing Sheets

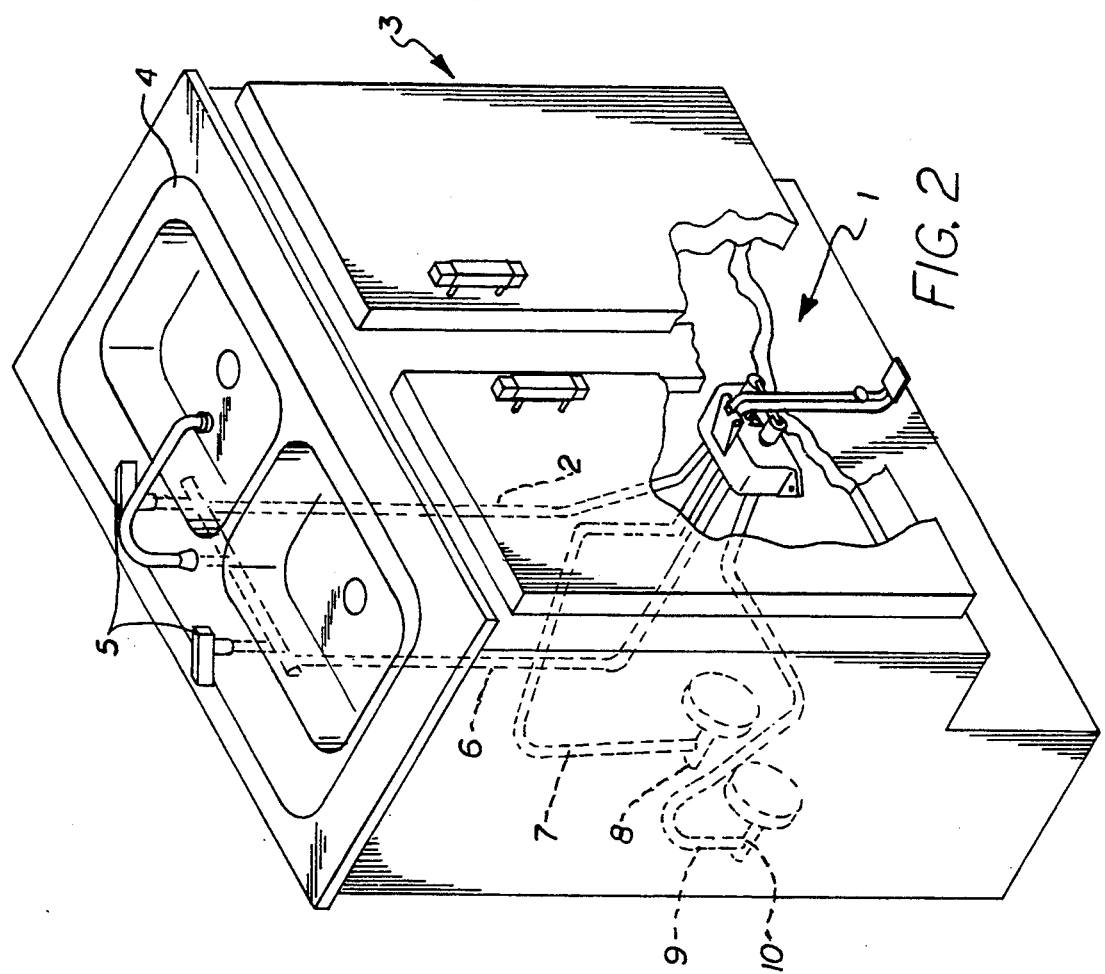
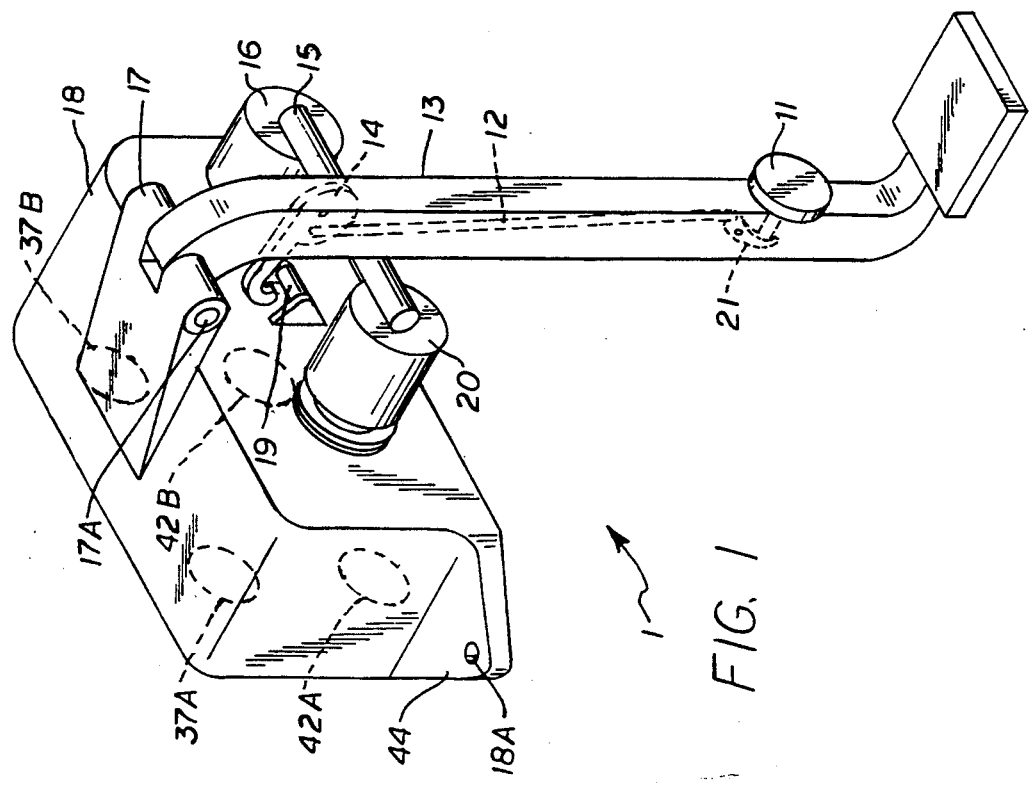

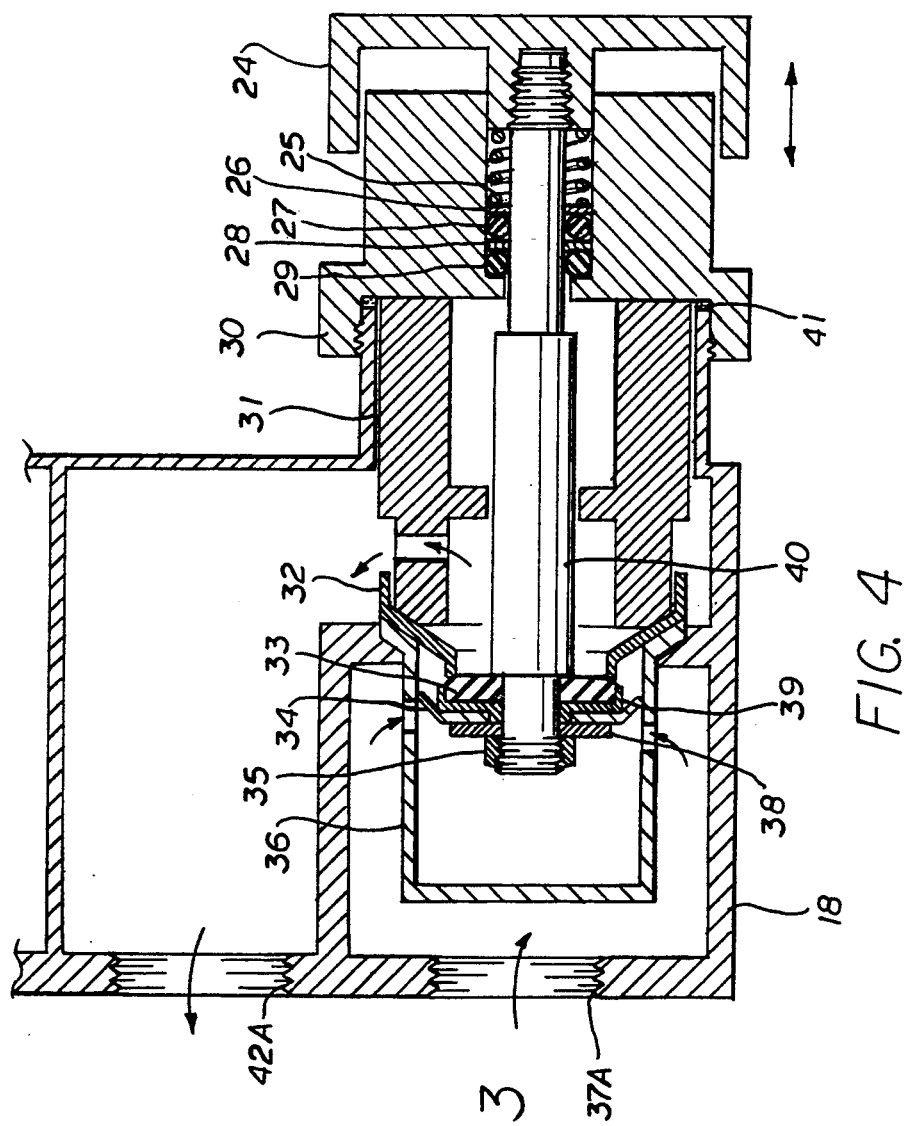
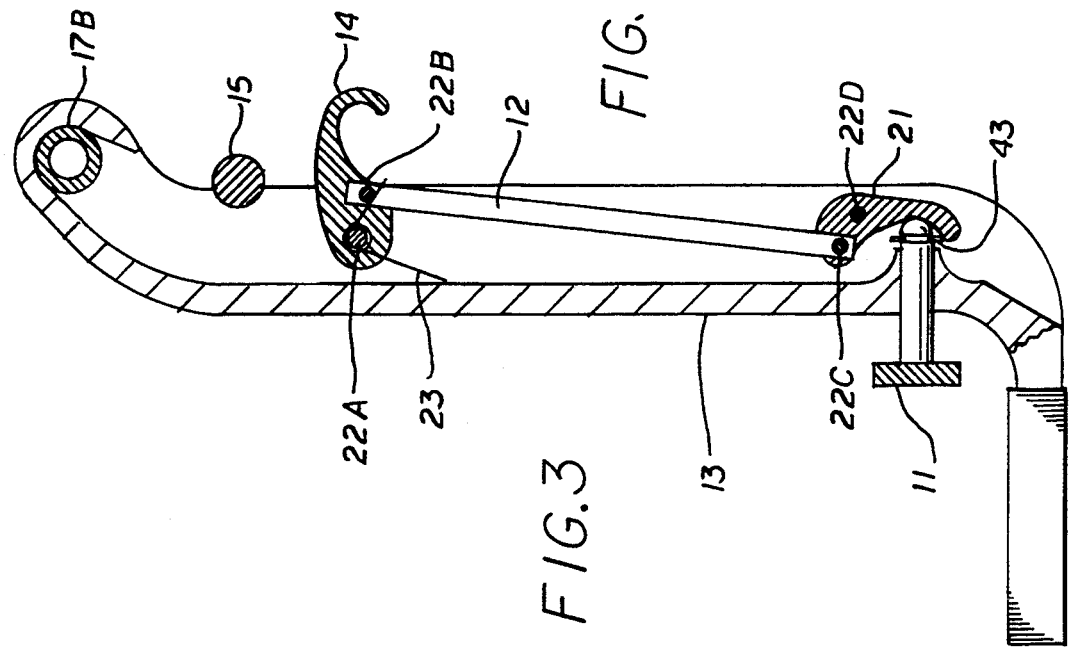
FIG. 4
FIG. 3

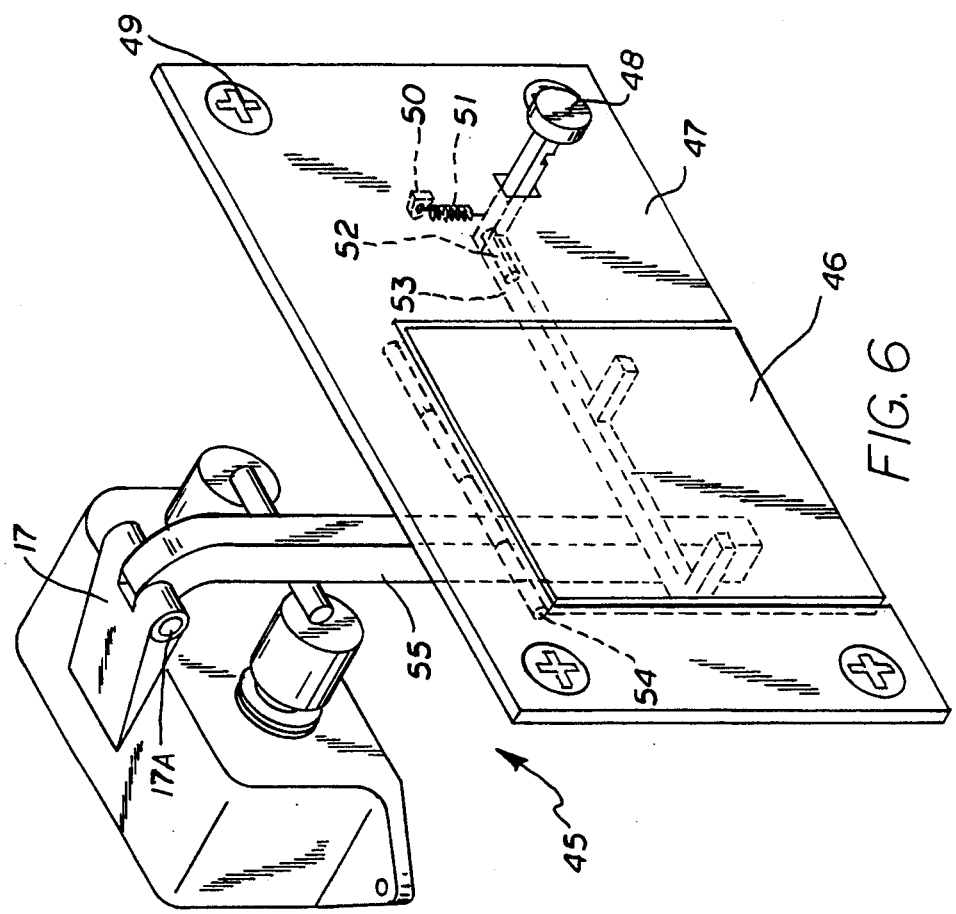
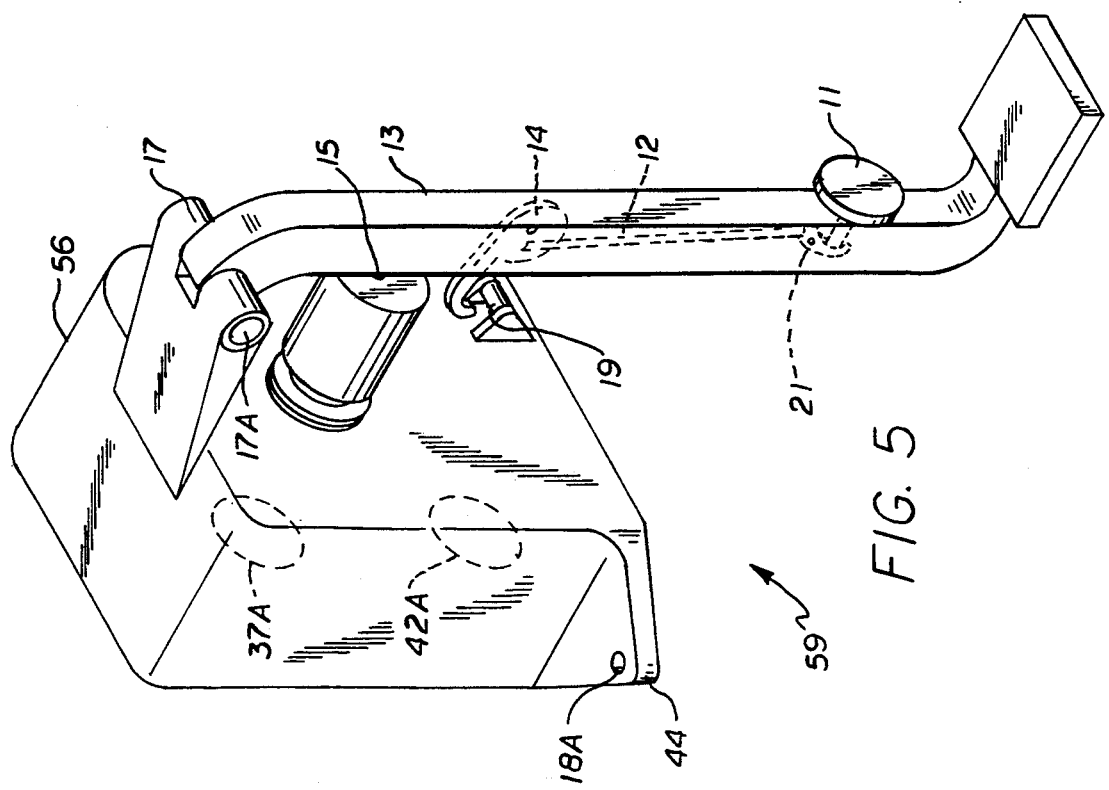

LATCHING FOOT PEDAL ACTUATED TAP WATER FLOW CONTROLLER

BACKGROUND—FIELD OF INVENTION

This invention relates to controlling fluid flow with a foot pedal and particularly, the flow of hot and cold water to kitchen and lavatory sinks, though not limited to these uses.

BACKGROUND—DESCRIPTION OF PRIOR ART

In buildings, houses, and apartments there are kitchen and lavatory faucets which are used to control the hot and cold water flow into sinks. These are usually hand operated devices that when opened, establishes a stream of water that flows into a sink. Once this task of turning on the water is accomplished, the hands are then free to perform other tasks. These tasks may include: washing dishes, filling a sauce pan with water, washing ones hands, shaving, etc. While these tasks are being performed, there are periods of time when the water is running, but it is not actually being used. For example, a dish has just been rinsed and is being placed in a drying rack or in the dishwasher. When the dish is not under the water stream flowing out of the faucet, the water is just flowing down the drain. During this time, water that is usually purchased, and many times heated, flows down the drain without performing a function. People can not help but do this because their hands are occupied with the dish or whatever. Some inventors have recognized this waste by inventing foot pedal actuated valves. These devices free up the hands to perform the tasks because the foot is used to turn the water off and on. Inventors have also recognized the convenience of using the foot instead of the hands to turn the water off and on. For example, when ones hands are covered with flour from preparing to fry chicken, one may turn on the water with their foot and rinse their hands without having to touch the knobs. This way the knobs do not become covered with flour and require rinsing.

Foot operated valves associated with kitchen and lavatory sinks are disclosed in U.S. Pat. Nos. 2,713,954; 2,830,618; 5,125,623; 1,848,456; and 1,619,234.

Examining prior art, one will see several different combinations: a foot pedal actuator with a valve mounted on the end of the spout, foot pedal actuated valves installed in parallel to hand faucets, foot pedal actuated valves without hand faucets, foot pedal actuated valves in series with hand valves, linkage connections from the pedal to the valve, cable connections from the pedal to the valve, and hose connections from the pedal to the valve.

However, general acceptance of a foot pedal flow controller for household use by the consumer has not been obtained. This is indicated by the fact that these devices are not commonly found in homes or apartments.

Reasons for this include:

(a) In some of this prior art, it is necessary to install a hand operated faucet assembly that is specifically designed for use with the foot pedal actuator. This adds to the expense and complexity of the installation.

(b) In some prior art there are cables or hoses that connect to a valve mounted on the end of the spout. These can hinder the rotational motion of the spout commonly found on modern kitchen sinks. These devices also add additional hardware to the top of the sink which may be considered unsightly by some.

(c) Some prior art does not utilize hand operated faucets to adjust the mix of hot and cold water to the desired temperature. These devices usually have separate pedals for both hot and cold water and a mixed stream flows out the spout. Temperature and flow adjustment is not easily accomplished.

(d) Some of the prior art has many individually installed components which complicate the installation of the foot pedal control device.

OBJECTS AND ADVANTAGES

Accordingly, the objects and advantages of this invention are:

(a) To provide a foot pedal operated valve with a latch that can be set to have the water continue to flow out the spout when the operator desires. Further, to have the latch set by simply depressing a toe kick with their foot and to have the latch automatically released by simply depressing the pedal.

With this latching feature, a person can set the latch and walk away from the pedal actuator and perform another task while water continues to flow out of the spout. This latched position is desirable when the operator wants to fill the sink, fill a large pot, or they are waiting for the hot water to arrive at the spout. In many homes, apartments, and buildings the hot water heater is located some distance from the sink. This causes a delay from the time the hot water valve is opened until hot water arrives at the spout. Many people do not like to have to stand with their foot on the pedal and wait for the hot water to arrive. The lack of a latch on a foot pedal operated valve may well be a primary reason that foot pedal operated valves are not commonly found in today's dwellings.

(b) To provide an assembly where a pedal is used to turn the hot and cold water off and on, and where a standard hand operated faucet set is used to control the desired temperature and flow.

When using a pedal to turn the water off and on, most individuals will use less water. Using less water reduces the cost of living for most consumers. First, they reduce the quantity of purchased water they consume. Second, they use less purchased energy because they use less hot water. Finally, they generate less waste water so there is a resultant lower sewage treatment cost. These savings will vary depending on where the consumer is and how they obtain these typical utilities.

Using this device also helps our environment by reducing the demand for water, a precious natural resource. In cities and communities with utility distribution systems, the demand on the water distribution system and sewage collection system is reduced. Because less water is used, less waste water is generated and as a result, the load on sewage treatment plants is reduced, sometimes improving the efficiency of the systems and possibly reducing the pollution flowing out to the environment.

Because this device is used with a standard hand operated faucet set, the flow rate and desired temperature is easy to set. One turns the knobs of the hot and cold water faucets to achieve the desired temperature and flow rate.

(c) To provide an assembly where most components are concealed in the cabinet under the sink. Only part of the pedal and part of the latch mechanism is visible in the toe space where the cabinet meets the floor. This feature helps provide an uncluttered appearance in a kitchen or lavatory.

(d) To provide a foot pedal actuated valve that is easy for a do-it-yourself person or plumber to install. By including mounting holes for the body, the assembly can be easily installed on the lowest shelf of the cabinet and flexible hoses can be used to transfer the fluids. If mounting holes are not provided, some sort of securing device or inflexible piping is needed to prevent the assembly from moving around when foot pressure is placed on the pedal. The ability to use flexible hoses significantly simplifies the installation.

(e) To provide a foot pedal actuated valve that is inexpensive to manufacture and thus inexpensive for the consumer.

DRAWING FIGS.

FIG. 1 shows a dual valve, single pedal, latching assembly; the preferred embodiment.

FIG. 2 shows the dual valve, single pedal, latching assembly installed in a cabinet. Portions of the cabinet are cut away to show said assembly. There are hoses that connect said assembly to sources of hot and cold water. The sources are shown as shut off valves typically found in modern dwellings. Also shown are hoses that connect hot and cold water from said assembly to a standard kitchen dual faucet set. The faucet set is shown installed into a dual sink. The positioning of said assembly has most components concealed behind closed cabinet doors. All that is visible when the cabinet door is closed is the lower end of the pedal and part of the latch mechanism.

FIG. 3 shows the pedal and parts of the latch mechanism.

FIG. 4 shows a cross sectional view of the components of one valve installed in part of the body.

FIG. 5 shows a single valve, single pedal, latching assembly, another embodiment used to control a single stream.

FIG. 6 shows a dual valve, single "kick plate" foot pedal, latching assembly. This is a modification to the preferred embodiment that has a different appearance.

Figure 8:
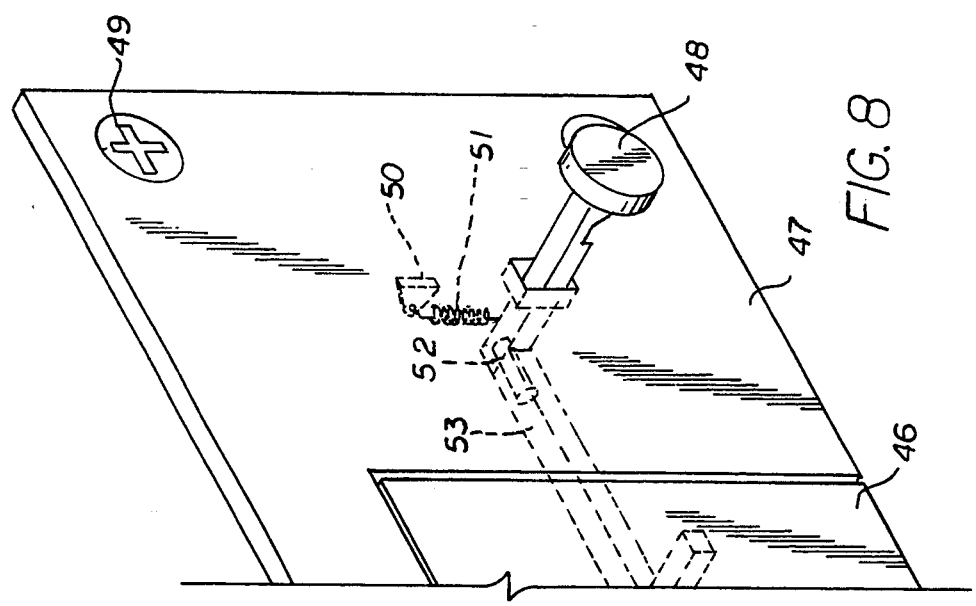
FIG. 8 shows the latch mechanism of the dual valve, single "kick plate" foot pedal, latching assembly. This drawing is an enlargement of the latch area so that it is easier to see.

| Reference Numerals in Drawings |
|---|
| 1 dual valve, single pedal latching assembly |
| 2 hose |
| 3 cabinet |
| 4 dual sink |
| 5 dual faucet set |
| 6 hose |
| 7 hose |
| 8 cold water source valve |
| 9 hose |
| 10 hot water source valve |
| 11 toe kick |

| -continued |
|---|
| Reference Numerals in Drawings |
| 12 linkage |
| 13 pedal |
| 14 hook arm |
| 15 valve contactor bar |
| 16 valve |
| 17 hinge bracket |
| 17A hinge pin |
| 17B bushing |
| 18 dual valve body |
| 18A body mounting hole |
| 19 latch catch |
| 20 valve |
| 21 cam |
| 22A pin |
| 22B pin |
| 22C pin |
| 22D pin |
| 23 spring |
| 24 valve cap |
| 25 spring |
| 26 washer |
| 27 o-ring |
| 28 leather |
| 29 o-ring |
| 30 bonnet |
| 31 sleeve |
| 32 seat |
| 33 seal |
| 34 cup |
| 35 stem nut |
| 36 dashpot |
| 37A inlet port |
| 37B inlet port |
| 38 washer |
| 39 retainer |
| 40 stem |
| 41 gasket |
| 42A outlet port |
| 42B outlet port |
| 43 snap ring |
| 44 flange |
| 45 "kick plate" foot pedal actuated, dual valve assembly |
| 46 "kick plate" foot pedal |
| 47 mounting plate |
| 48 latching toe kick |
| 49 mounting screw |
| 50 spring support arm |
| 51 spring |
| 52 pivot pin |
| 53 contactor arm |
| 54 hinge |
| 55 actuator arm |
| 56 single valve body |
| 57 toe plate of cabinet |
| 58 single valve, "kick plate" foot pedal actuated, latching assembly |
| 59 single valve, single pedal, latching assembly |
| 60 multiple pedal actuated, multiple valve, flow controller assembly |

DESCRIPTION—FIGS. 1 to 10

All components of this invention, unless otherwise specified, can be made from a variety of materials including but not limited to brass, carbon steel, stainless steel, aluminum, titanium, plastic, resins or any material than can be formed shaped, machined, cast, or by any other means dimensionally modified into shapes that permit the construction of the parts of this invention. The wetted parts require materials that are at least sufficiently impermeable that no visible fluids penetrate the wetted parts. The wetted parts must also have sufficient strength to withstand the pressures encountered in the application of this invention with out deterioration or deformation that would prevent the continued operation of this invention. Corrosion and erosion effects should also be considered when making material of construction decisions to not only prevent the deterioration of this invention but also to prevent contamination of the fluids that pass through this invention.

The preferred embodiment of the Latching Foot Pedal Actuated Tap Water Flow Controller is shown in FIG. 1. It consists of two valve assemblies 16 and 20 threaded into body 18. It further consists of a hinge bracket 17 with hinge pin 17A. Hinge pin 17A is inserted through hinge bracket 17 and through bushing 17B, FIG. 3, of pedal 13. Affixed to pedal 13 is valve contactor bar 15 which makes contact with, but is not attached to, valve caps 24, FIG. 4, on the end of valves 16 and 20.

Within Pedal 13 are parts of the latch assembly and are more completely shown in FIG. 3. Toe kick 11, has a head and shaft. It is held in position but slides laterally through a slightly larger hole through pedal 13. The head of toe kick 11 and snap ring 43 retain toe kick 11 from sliding out its hole in pedal 13. Cam 21 is held into pedal 13 and rotates about pin 22D. Linkage 12 is connected to cam 21 and hinges about pin 22C. The other end of linkage 12 is connected to hook arm 14 and hinges about pin 22B. Hook arm 14 is connected to pedal 13 and rotates about pin 22A. Mounted on Pin 22A is spring 23 which bears against pedal 13 and pin 22B. This spring is used to keep the pedal unlatched except when the toe kick is depressed.

Most of the vertical part of pedal 13 is channel shaped to conceal much of the latch mechanism and to provide support of pins 22D and 22A. Holes through both legs of the channel provide for the insertion of said pins to support said parts of the latch mechanism. The top of pedal 13 contains bushing 17B for the insertion of hinge pin 17A. The bottom of pedal 13 is shaped to provide a place for the user to position the end of his foot to actuate the valves. This shape at the bottom of the pedal can take many forms and is not even necessary for the construction or operation of the invention.

Affixed to body 18 as shown in FIG. 1 is latch catch 19. It consists of a cylindrical pin held between two brackets. The positioning of latch catch 19 and the shape of hook arm 14 is such that when toe kick 11 is depressed, pedal 13 moves in depressing valves 16 and 20, hook arm 14 rotates downward and becomes hooked over latch catch 19.

The valves 16 and 20, with one being shown in cross section view in FIG. 4, are threaded into the body 18. This is accomplished when threads in bonnet 30 engage threads cut in body 18. The bonnet is sealed to the body with ring gasket 41. Ring gasket 41 is made of a compressible material like but not limited to cork. Partially fitting over bonnet 30 is cap 24 which is permitted axial motion by the shape of bonnet 30 and cap 24. Affixed to the center of cap 24 is stem 40. Around stem 40 and contained within bonnet 30 are spring 25, washer 26, O-ring 27, leather 28, and O-ring 29, all serving to seal the fluid within the invention in this area. O-rings 27 and 28 are made of rubber or a rubber like product. Leather 28 is shaped like a common washer and is made of leather or a leather like product. Spring 25 also serves to bias the valve, and in this embodiment, into the closed position. The finish on stem 40 needs to be sufficiently smooth to not cut O-ring 27, leather 28, or O-ring 29. Sleeve 31 is constructed to just slip into the valve port of the body. It is also constructed to provide stabilization of stem 40 as stem 40 moves axially during actuation. There is also a port in sleeve 31 that permits the fluid to pass into the outlet passageway of body 18 when the valve is opened. There is also an angle cut on the end of sleeve 31 that serves to center the sleeve and seat 32. Seat 32 is shaped to just fit over sleeve 31 and to serve as the smooth flat surface that seal 33 bears against. Dash pot 36 contains ports to allow the fluid to enter the seal area and is shaped to allow cup 34 to isolate fluid from, or permit fluid flow to, the seal area as cup 34 moves axially with stem 40. Cup 34 is rubber or a rubber like product with an O.D. (outside diameter) slightly larger than the I.D. (inside diameter) of dashpot 36 but because of its cup shape, movement of cup 34 within dashpot 36 is not inhibited.

Dashpot 36, seat 32, sleeve 31, and body 31 must have parallel surfaces or in other ways be constructed to be leak free where these parts intersect. The length of sleeve 31, and thickness of seat 32 and dashpot 36 must also be controlled so that when a valve assembly is installed in the body, a tight fit with the body occurs at said intersection. This prevents fluid flow through this intersection.

Seal 33 is a rubber or rubber like product with an I.D. to fit snugly over stem 40 and an O.D. slightly larger than the seating surface.

Retainer 39 is shaped to restrain the elastic deformation of the O.D. of seal 33, and to prevent excessive compression of cup 34 during assembly.

Washer 38 is a standard washer that supports one side of cup 34. Nut 35 screws on to stem 40 and is used to secure washer 38, cup 34, retainer 39, and seal 33 on to stem 40.

The body 18 has 4 threaded ports, 37A, 37B, 42A, and 42B for connecting inlet and outlet hoses. There are passageways in the body that allows fluid to flow from the inlet port to the seal area and from the seal area to the outlet port.

Body 18 also contains mounting holes 18A on flanges 44.

FIG. 2 shows the dual valve, single pedal, latching assembly 1 installed in a standard kitchen cabinet 3. A hole has been cut in the lowest shelve or base of cabinet 3 large enough for the pedal and latch mechanism to not only fit through but also to allow the desired motion. The placement of the hole is in the front of the cabinet so the pedal is in the toe space just in front of the intersection of the cabinet with the floor. Two screws are installed through body mounting holes 18A, FIG. 1, securing the assembly to cabinet 3. One end of flexible hose 9 is connected to hot water source valve 10, and hose 9 is routed to inlet port 37A where the other end of the hose 9 is connected. Another flexible hose 6 is connected to outlet port 42A on one end, and routed to the hot water inlet of faucet set 5 where the other end of hose 6 is connected. Hose 7 and hose 2 are similarly installed for the cold water.

FIG. 5 shows single valve, single pedal, latching assembly 59. Its configuration is similar to that described for FIGS. 1, 3 and 4. This assembly however only has one valve, valve 16 that interrupts and controls the flow of one fluid. It also only has one inlet port 37A and one outlet port 42A in a single valve body 56.

FIG. 6 shows a "kick plate" foot pedal actuated, dual valve, latching assembly 45. This is another embodiment that functions the same as the assembly in FIG. 1, but has a significantly different appearance. It is identical to FIG. 1 and 3 except as follows: Parts of the latch mechanism 19, 14, 13, 12, 21, 22B, 22D, 43, 11, 220, 23, 22A, are eliminated. Mounting plate 47 has holes for screws 49 to mount the actuator assembly to a surface. Hinge 54 is attached to mounting plate 47 and also to "kick plate" foot pedal 46. Contactor arm 53 is attached to "kick plate" foot pedal 46 and contacts but is not attached to actuator arm 55. Actuator arm 55 is connected to hinge bracket 17 by hinge pin 17A. FIG. 8, an enlargement of the latch parts, shows latching toe kick 48 connected to contactor arm 53 by pivot pin 52. This connection allows latching toe kick 48 to rotate and the slot in latching toe kick 48 to latch into the matching catch in mounting plate 47. Spring 51 is connected to latching toe kick 48 and spring support arm 50. Spring support arm 50 is connected to mounting plate 47.

Figure 7:
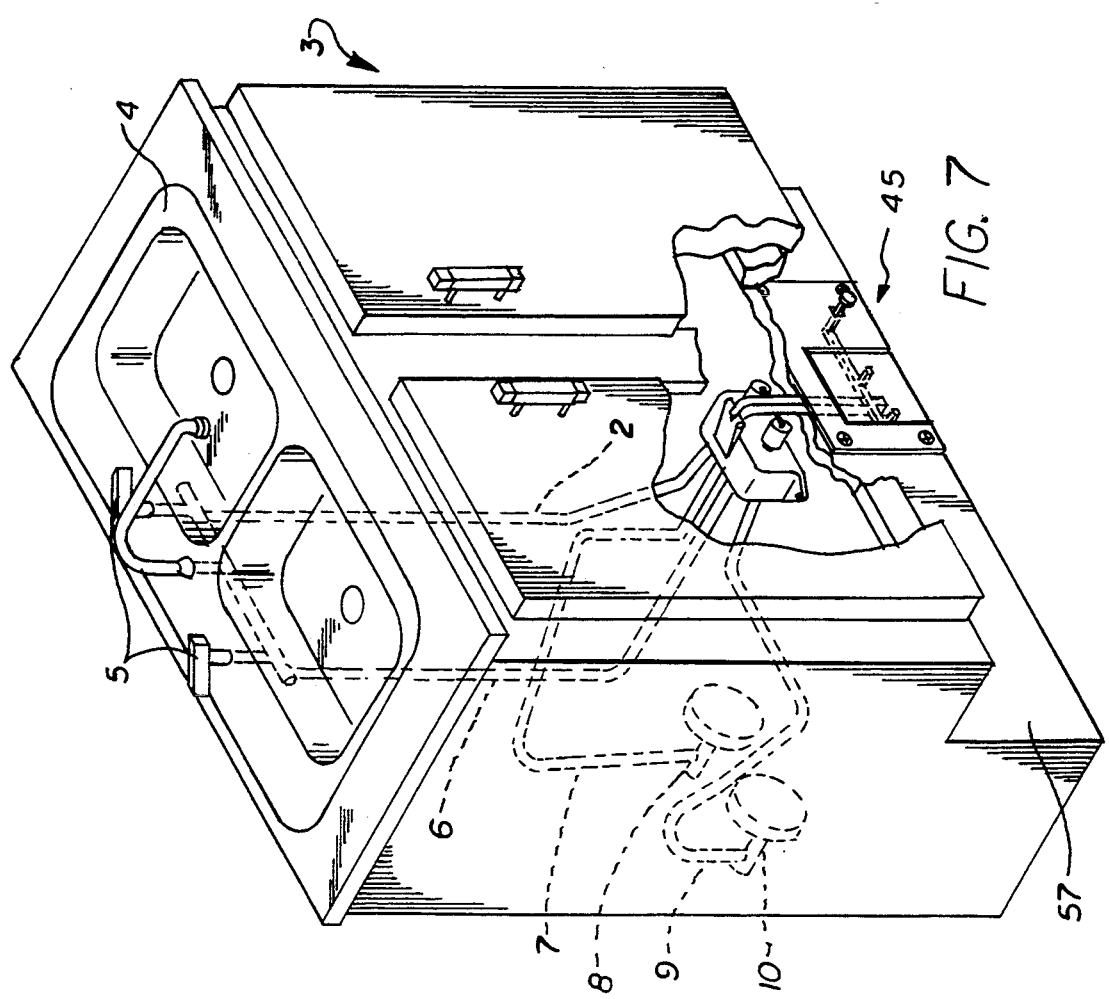
FIG. 7 shows a dual valve, single "kick plate" foot pedal, latching assembly installed in a cabinet.

FIG. 7 shows the "kick plate" foot pedal actuated, dual valve latching assembly 45 installed in cabinet 3 similarly to the way the dual valve single pedal assembly 1 is installed in cabinet 3 in FIG. 2. The differences being mounting plate 47, FIG. 6, is attached to toe plate 57 of cabinet 3. A portion of toe plate 57 must be removed from cabinet 3 to allow the motions of said components of "kick plate" foot pedal actuated dual valve assembly 45.

Figure 9:
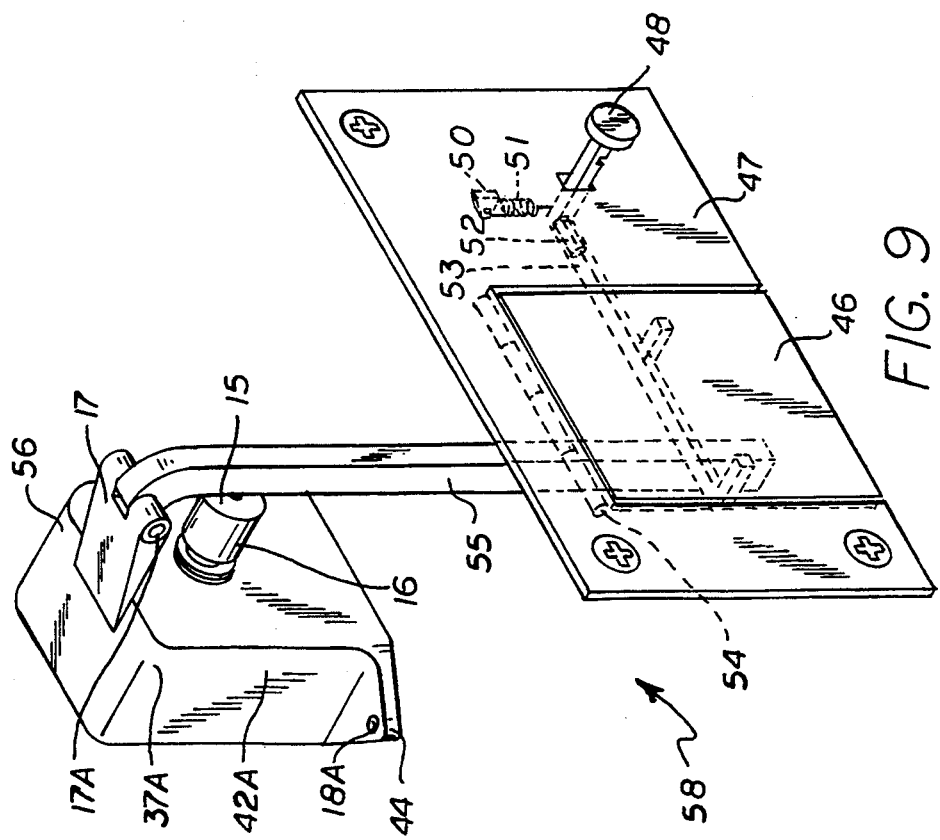
FIG. 9 shows a single valve, single "kick plate" foot pedal, latching assembly. Another embodiment for controlling a single fluid.

FIG. 9 shows a "kick plate" foot pedal actuated single valve, latching assembly 58 with components previously described above.

Figure 10:
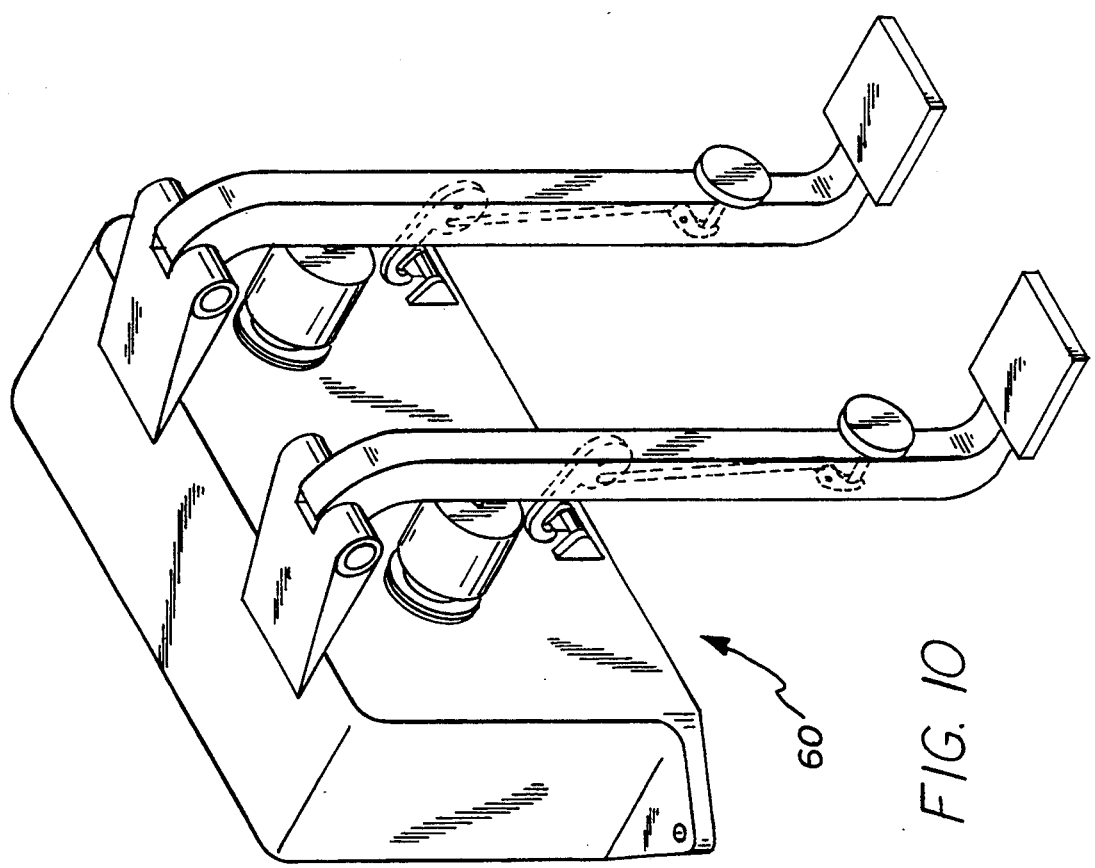
FIG. 10 shows a pedal actuated flow controller with plural valves with a pedal and latch mechanism for each valve.

FIG. 10 shows multiple pedal actuated, multiple valve, latching assembly 60, with components previously described above.

OPERATION—FIGS. 1-10

To operate the preferred embodiment shown in FIGS. 1-4, a person is to depress pedal 13 with their foot. When depressing the pedal, the proximal end of pedal 13 rotates about hinge pin 17A, valve contactor bar 15 exerts pressure on cap 24, and the bias pressure of spring 25 is over come. The fluid pressure is also over come. Cap 24, stem 40, seal 33, retainer 39, cup 34, washer 38, and nut 35 all move axially as a result. When cup 34 exposes holes in dashpot 36, and seal 33 moves off of seat 32, fluid flow through the invention is permitted. The fluid flows through inlet port 37A, through the inlet passageway in body 18, through holes is dashpot 36, through the space between seal 33 and seat 32, through the hole in sleeve 31, through the outlet passageway in body 18 and finally through outlet port 42A.

When pedal 13 is released by the operator, spring 25 exerts pressure on cap 24 and fluid pressure reverses the said axial motion of said elements. Seal 33, as a result, bears against seat 32 interrupting fluid flow. Valve contactor bar 15 and pedal 13 are returned to the original positions. When the operator desires to have continuous fluid flow, the operator depresses toe kick 11 and by continuing the same motion, pedal 13 moves in the same previously described manner. The latch mechanism has become engaged as a result, and when the foot is removed, the pedal remains in a depressed position. Fluid flow will continue to occur.

The action of the latch mechanism is as follows: Toe kick 11 moves axially in its hole in pedal 13 when sufficient foot pressure is exerted on the head of toe kick 11. Toe kick 11 contacts cam 21 and cam 21 rotates about pin 22D. Because linkage 12 is not only connected to cam 21 with pin 22C but also to hook arm 14 with pin 22B, a motion of cam 21 results in a motion of hook arm 14. Hook arm 14 rotates about pin 22A and overcomes the bias pressure of spring 23. Hook arm 14 becomes hooked over latch catch 19 as a result of the combined motion of pedal 13 and the latch mechanism.

To interrupt fluid flow and release the latch mechanism, the operator again depresses pedal 13, and does not touch toe kick 11. As the hook on hook arm 14 clears latch catch 19, spring 23 forces hook arm 14 to rotate opposite the previously described direction. Due to the interconnections of the latch elements, each returns to the unlatched position. Spring 23 continues to maintain the elements in the unlatched position until the operator repeats the latching motion. FIG. 2 shows the preferred embodiment installed in typical kitchen cabinet. The operator depresses pedal 13 when it is desired to establish flow and releases pedal 13 when it is desirable to stop flow. The operator uses the knobs of faucet set 5 to adjust hot and cold water flows to achieve the desired temperature and flow rate of the water.

If the operator desires continuous flow out of the spout of faucet set 5, toe kick 11, FIG. 1, is depressed which engages the latch. This operation is desirable when the hot water has not yet arrived at sink 4, or when a large container is being filled.

The operation of single valve, single pedal latching assembly 59 of FIG. 5 is identical to that described of dual valve, single pedal latching assembly 1 except that only one valve 16 is actuated by the motions of the operator. The flow of only one fluid is interrupted or regulated with this embodiment.

The operation of the embodiment shown in FIGS. 6 and 8 is similar to that described for the embodiment of FIG. 1 except as follows: "kick plate" foot pedal 46 rotates about hinge 54 when foot pressure is exerted by the operator. Contactor arm 53 exerts pressure on actuator arm 55 with moves as pedal 13 in FIG. 1. This motion establishes fluid flow. To stop flow, the operator removes foot pressure from "kick plate" foot pedal 46.

To latch this embodiment, toe kick 48 is depressed. The motion of the foot by the operator should also produce a downward force. When this occurs, the slot of toe kick 48 will move into the catch of mounting plate 47. Movement of toe kick 48 will produce the needed motion of contactor arm 53 to establish fluid flow. When this motion is executed by the operator, "kick plate" foot pedal actuated dual valve assembly 45 is in the latched open position. Fluids will flow through said assembly until "kick plate" foot pedal 46 is pressed again. At this time, the slot in toe kick 48 will clear the catch in mounting plate 47 and spring 51 will lift toe kick 48 up. When foot pressure is removed from "kick plate" foot pedal 46, the components will return to the original positions and no fluid flow will occur.

FIG. 7 shows "kick plate" foot pedal actuated, dual valve, latching assembly 45 installed in cabinet 3. The operator depresses "kick plate" foot pedal 46, FIG. 6, when it is desired to establish flow and releases "kick plate" foot pedal 46 when it is desirable to stop flow. The operator uses the knobs of faucet set 5 to adjust hot and cold water flows to achieve the desired temperature and flow rate of the water.

If the operator desires continuous flow out of the spout of faucet set 5, toe kick 48, FIG. 6, is depressed which engages the latch.

The operation of single valve, "kick plate" foot pedal actuated, latching assembly 58 of FIG. 9 is identical to that described of "kick plate" foot pedal actuated, dual valve assembly 45 except that only one valve 16 is actuated by the motions of the operator. The flow of only one fluid is interrupted or regulated with this embodiment.

The operation of multiple pedal actuated, multiple valve, latching, flow controller assembly 60 of FIG. 10 is identical to that described for FIG. 5 except that there are multiple pedals, latches, and valves; one for each fluid stream to be controlled.

SUMMARY, RAMIFICATIONS, AND SCOPE

Accordingly, this invention provides simple foot pedal control of water flow to kitchen and lavatory sinks. When using this device, most individuals will use less water. Using less water reduces the cost of living for consumers by saving on purchased water, using less energy to heat some of the water, and a reduction in waste water treatment cost.

Using this device also helps our environment by reducing the demand for water, a precious natural resource. In cities and communities with utility distribution systems, the demand on the water distribution system and sewage collection system is reduced. Because less water is used, less waste water is generated. Reducing the load on sewage treatment plants sometimes improves the efficiency of the systems and reduces the pollution flowing out to the environment.

The latch mechanism provides a way for the operator to leave the water running until hot water reaches the spout, or fill the sink, without having to keep a foot continuously on the pedal.

By having pedal action and a latch, consumers can save water when they are actively using water to perform tasks, but are not required to stand their with there foot on the pedal and wait for the hot water to get there. Some consumers would prefer to sacrifice the savings than to have to stand on the pedal and wait. The latch eliminates this inconvenience.

By including mounting holes for the body, the assembly can be easily installed on the base of the cabinet and flexible hoses can be used to transfer the fluids. Using hoses significantly simplifies the installation.

The shape and arrangement of the assemblies allows for a concealed installation where only part of the actuator, and part of the latch mechanism are visible in the toe space at the bottom, front of the cabinet. Many consumers will consider this to be an important attribute that helps limit the exposed clutter in a kitchen or lavatory.

Although the descriptions above contain many specificities, these should not be construed as limiting the scope of the invention but as merely providing illustrations of some of the presently preferred embodiments of this invention. Many modifications can be made. For example, a variety of shapes for the pedal and body could be used. Different mounting configurations could be used as well. Another embodiment where the assembly is not mounted in a cabinet is possible. The pedal or pedals could be affixed to the caps or ends of the valves. Different configurations of the valve components are possible. Different latch mechanisms could be used. The invention can be used in applications other than controlling water flow to a kitchen or lavatory sink. A variety of materials can be used and the surfaces can have a variety of finishes and colors.

Thus the scope of the invention should be determined by the appended claims and their legal equivalents, rather than by the examples given.

I claim:

1. A foot pedal actuated fluid flow controller assembly comprising:

a valve body having at least one fluid inlet port adapted for connection to a fluid source and at least one fluid outlet port adapted for connection to a fluid conduit and at least one internal fluid flow passageway extending between each said fluid inlet port and said fluid outlet port;

valve means movably positioned in each said fluid flow passageway and movable between a normally closed position and an open position to regulate a flow of fluid therethrough;

a foot pedal having an upper portion pivotally connected to said valve body and a lower portion wherein said foot pedal is engageable; with said valve means for moving said valve means between the normally closed position and the open position;

releasable latch means connected to said foot pedal for selectively maintaining said foot pedal in a depressed position engaged with said valve means to maintain said valve means in the open position; and latch actuator connected to said releasable latch means to selectively move said releasable latch means to a latched position to maintain said foot pedal in said depressed position and selectively movable to an unlatched position to allow said valve means to assume the normally closed position whereby said latch means is selectively engageable with said valve body upon depressing said foot pedal and said latch actuator a first time to maintain said foot pedal in said depressed position engaged with said valve means for maintaining said valve means in the open position and is selectively disengaged from said valve body upon depressing said foot pedal a second time.

2. The flow controller assembly of claim 1 in which said valve body is adapted to be secured to a lower portion of a floor supported cabinet of the type having doors and a toe space in front of the intersection of the cabinet and the floor;

said valve body being concealed when the cabinet doors are closed, and said foot pedal pivotally connected on said valve body having the lower portion of said pedal extending through the cabinet lower portion to reside in the toe space.

3. The flow controller assembly of claim 1 in which said releasable latch means comprises a latch member pivotally connected to said foot pedal and movable between an engaged position to retain said foot pedal in a depressed position and a normally disengaged position to allow movement of said foot pedal, and spring means connected with said latch member to urge said latch member to the normally disengaged position, and said latch actuator comprises a toe kick actuator connected with said foot pedal to move therewith and being independently movable relative thereto and operatively connected with said latch member to pivot said latch member to the engaged position upon said toe kick and said foot pedal being depressed said first time by the toe of an operator and said toe kick actuator being released from said latch member to allow said spring means to pivot said latch member to the disengaged position upon said foot pedal being said second time depressed.

4. The flow controller assembly of claim 3 including a cam member pivotally connected to said foot pedal, said toe kick actuator being engaged with said cam member and pivoting same upon being moved relative to said foot pedal by the toe of an operator, and linkage means connected between said cam member and said latch member for pivoting said latch member upon pivotal movement of said cam member caused by engagement with said toe kick actuator to move said latch member to the engaged position.

5. The flow controller assembly of claim 4 in which said valve body has a latch receptacle, and said latch member has a hook portion at one end configured to releasably engage said latch receptacle in the engaged position.

6. The flow controller assembly of claim 1 in which said valve body has a latch receptacle; and said releasable latch means comprises;

a latch member pivotally connected to said foot pedal and movable between an engaged position to retain said foot pedal in a depressed position and a normally disengaged position to allow movement of said foot pedal, said latch member having a hook portion at one end configured to releasably engage said latch receptacle in the engaged position;

spring means connected with latch member to urge said latch member to the normally disengaged position;

said latch actuator comprises a cam member pivotally connected to said foot pedal;

linkage means connected between said cam member and said latch member for pivoting said latch member upon pivotal movement of said cam member;

a toe kick actuator mounted on said foot pedal lower portion to move therewith and being independently movable relative thereto to engage said cam member and pivot same upon said toe kick and said foot pedal being depressed said first time by the toe of an operator and thereby pivot said latch member to the engaged position and said toe kick actuator being released from said cam member to allow said spring means to pivot said latch member to the disengaged position upon said foot pedal being depressed said second time.

7. The flow controller assembly of claim 1 including first flexible conduit means connected at one end to said at least one fluid inlet port and at an opposite end adapted to be connected to a fluid source for conducting fluid into said valve body internal fluid flow passageway, and second flexible conduit means connected at one end to said at least one fluid outlet port and at an opposite end adapted to be connected to at least one fluid inlet of a faucet for conducting fluid from said valve body internal fluid flow passageway to the faucet when said valve means is in the open position.

8. A foot pedal actuated fluid flow controller assembly for controlling a flow of plural fluids comprising:

a valve body having a first fluid inlet port adapted for connection to a first fluid source and a first fluid outlet port adapted for connection to a first fluid conduit and a first internal fluid flow passageway extending between said first fluid inlet port and said first fluid outlet port;

said value body further having a second fluid inlet port adapted for connection to a second fluid source and a second fluid outlet port adapted for connection to a second fluid conduit and a second internal fluid flow passageway extending between said second fluid inlet port and said second fluid outlet port;

valve means movably positioned in each of said first and second internal fluid flow passageways and movable between a normally closed position and an open position to regulate a flow of fluid therethrough;

a foot having an upper portion pedal pivotally connected to said valve body and a lower portion wherein said foot pedal is engageable with each of said valve means for moving each of said valve means between the normally closed position and the open position;

releasable latch means connected with said foot pedal for selectively maintaining said foot pedal in a depressed position engaged with said valve means to maintain said valve means in the open position; and a latch actuator connected with said releasable latch means to selectively move said releasable latch means to a latched position to maintain said foot pedal in said depressed position and selectively movable to an unlatched position;

whereby said latch means is selectively engageable with said value body upon depressing said foot pedal and said latch actuator a first time to maintain said foot pedal in said depressed position engaged with said valve means for maintaining said valve means in the open position and is selectively disengaged from said valve body upon depressing said foot pedal a second time.

9. A foot pedal actuated fluid flow controller assembly for controlling a flow of plural fluids comprising:

a valve body having a first fluid inlet port adapted for connection to a first fluid source and a first fluid outlet port adapted for connection to a first fluid conduit and a first internal fluid flow passageway extending between said first fluid inlet port and said first fluid outlet port;

said valve body further having a second fluid inlet port adapted for connection to a second fluid source and a second fluid outlet port adapted for connection to a second fluid conduit and a second internal fluid flow passageway extending between said second fluid inlet port and said second fluid outlet port;

first and second valve means movably positioned in each of said first and second internal fluid flow passageways, respectively, and movable between a normally closed position and an open position to regulate a flow of fluid therethrough;

a first and second foot pedal, each of said pedals having an upper portion connected to said valve body and a lower portion wherein each of said foot pedals is engageable respective one of said valve means for independently moving said respective valve means between the normally closed position and the open position;

first and second releasable latch means connected with said first and second foot pedals, respectively, for selectively maintaining said respective foot pedal, in a depressed position engaged with said respective valve means to maintain said respective valve means in the open position; and a latch actuator connected with said first and second releasable latch means, respectively, to selectively move said respective releasable latch means to a latched position to independently maintain said respective foot pedals in said depressed position and selectively movable to an unlatched position;

each of said respective releasable latch means and said respective latch actuators being selectively engageable to independently maintain said respective foot pedals in said depressed position engaged with a said respective valve means to maintain said respective valve means in the open position and to release said respective valve means to assume the normally closed position, whereby said first and second latch means are selectively engageable with said valve body upon selectively depressing said respective foot pedals and said respective latch actuators a first time to maintain said respective foot pedals in said depressed position engaged with said respective valve means for maintaining said respective valve means in the open position and each of said foot pedals is selectively disengaged from said respective valve means upon selectively depressing said respective foot pedals a second time.

10. A faucet having a foot pedal actuated fluid flow controller for controlling a flow of a fluid through the faucet comprising:

faucet having at least one fluid inlet and an outlet spout;

valve body having at least one fluid inlet port adapted for connection to a fluid source and at least one fluid outlet port and at least one internal fluid flow passageway extending between each said fluid inlet port and said and fluid outlet port;

flexible conduit means connected at one end to said at least one fluid outlet port and at an opposite end to said at least one fluid inlet of said faucet for conducting fluid from said valve body internal fluid flow passageway to said faucet;

valve means movably positioned in each of said fluid flow passageways and movable between a normally closed position and an open position to regulate a flow of fluid therethrough;

a foot pedal having an upper portion pivotally connected to said valve body and a lower portion wherein said foot pedal is engageable with said valve means for moving said valve means between the normally closed position and the open position;

releasable latch means on said foot pedal for selectively maintaining said foot pedal in a depressed position engaged with said valve means to maintain said valve means in the open position; and a latch actuator on said foot pedal to selectively move said releasable latch means to a latched position to maintain said foot pedal in said depressed position and selectively movable to an unlatched position to allow said valve means to assume the normally closed position, whereby said latch means is selectively engageable with said valve body upon depressing said foot pedal and said latch actuator a first time to maintain said foot pedal in said depressed position engaged with said valve means for maintaining said valve means in the open position and is selectively disengaged from said valve body upon depressing said foot pedal a second time.

11. A cabinet having a sink, a faucet, and a foot pedal actuated fluid flow controller for controlling a flow of a fluid through the faucet comprising:

floor supported cabinet having a top surface, a horizontal surface at a lower portion thereof, and doors;

sink mounted in said top surface;

toe space in front of the intersection of said cabinet and the floor on which it is supported;

faucet mounted on said sink having at least one fluid inlet and an outlet spout;

valve body adapted to be secured to a lower portion of said cabinet and concealed when the cabinet doors are closed;

said valve body having at least one fluid inlet port adapted for connection to a fluid source and at least one fluid outlet port and at least one internal fluid flow passageway extending between each of said fluid inlet ports and said and fluid outlet ports;

flexible conduit means connected at one end to said at least one fluid outlet port and at an opposite end to said at least one fluid inlet of Said faucet for conducting fluid from said valve body internal fluid flow passageway to said faucet;

valve means movably positioned in each of said fluid flow passageways and movable between a normally closed position and an open position to regulate a flow of fluid therethrough;

a foot pedal having an upper portion pivotally connected to said valve body and a lower portion wherein said foot pedal is engageable with said valve means for moving said valve means between the normally closed position and the open position, said foot pedal having said lower portion extending through the cabinet lower portion to reside in said toe space; releasable latch means on said foot pedal for selectively maintaining said foot pedal in a depressed position engaged with said valve means to maintain said valve means in the open position; and a latch actuator on said foot pedal lower portion to selectively move said releasable latch means to a latched position to maintain said foot pedal in said depressed position and selectively movable to an unlatched position to allow said valve means to assume the normally closed position, whereby said latch means is selectively engageable with said valve body upon depressing said foot pedal and said latch actuator a first time to maintain said foot pedal in said depressed position engaged with said valve means for maintaining said valve means in the open position and is selectively disengaged from said valve body upon depressing said foot pedal a second time.

* * * * *